US 6,741,705 B1

(12) United States Patent
Nelson et al.

(10) Patent No.: US 6,741,705 B1
(45) Date of Patent: May 25, 2004

(54) SYSTEM AND METHOD FOR SECURING VOICE MAIL MESSAGES

(75) Inventors: Mark R. Nelson, Plano, TX (US); K. Paul Clark, Frisco, TX (US); Charles A. Munro, Coppell, TX (US); Jeffrey A. Sanders, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/511,082

(22) Filed: Feb. 23, 2000

(51) Int. Cl.[7] .................. H04K 1/00; H04M 11/00; H04M 1/19; H04L 9/00
(52) U.S. Cl. .................. 380/257; 379/93.24; 713/193
(58) Field of Search .................. 713/200, 193; 379/93.24; 380/257

(56) References Cited

U.S. PATENT DOCUMENTS

| | | | | |
|---|---|---|---|---|
| 5,058,164 A | * | 10/1991 | Elmer et al. ............... 713/190 |
| 5,608,786 A | * | 3/1997 | Gordon ....................... 370/352 |
| 5,717,742 A | * | 2/1998 | Hyde-Thomson ......... 379/88.17 |
| 5,740,230 A | * | 4/1998 | Vaudreuil .................. 379/88.22 |
| 5,862,223 A | * | 1/1999 | Walker et al. ............... 705/50 |
| 5,862,325 A | * | 1/1999 | Reed et al. ................. 709/201 |
| 6,154,465 A | * | 11/2000 | Pickett ....................... 370/466 |
| 6,233,318 B1 | * | 5/2001 | Picard et al. .............. 379/88.17 |
| 6,452,923 B1 | * | 9/2002 | Gerszberg et al. ......... 370/352 |
| 6,625,142 B1 | * | 9/2003 | Joffe et al. ................. 370/356 |

OTHER PUBLICATIONS

Linn, RFC 1421, "Privacy Enhancement for Internet Electronic Mail: Part I: Message Encryption and Authentication Procedures," 1993.*
Kent, RFC 1422, "Privacy Enhancement for Internet Electronic Mail: Part II: Certificate–Based Key Management," 1993.*
Cisco Systems, Inc.; "System Descrition for the Cisco Communications Network Version 2.1;" Cisco Communications Network; all, 1997.

\* cited by examiner

*Primary Examiner*—Gregory Morse
*Assistant Examiner*—Matthew Heneghan
(74) *Attorney, Agent, or Firm*—Baker Botts L.L.P.

(57) ABSTRACT

A system is provided for securing voice mail messages. The system includes a packet network and a telephony device that is coupled to the packet network. The system also includes a voice mail system that is coupled to the packet network and that receives a voice mail message from a caller attempting to communicate with a user of the telephony device. The voice mail system encrypts the voice mail message using a public key associated with the telephony device and stores the encrypted voice mail message in an open file system coupled to the packet network.

32 Claims, 3 Drawing Sheets

| TELEPHONE EXTENSION | DEVICE NAME | IP ADDRESS | USER ID | PUBLIC KEY |
|---|---|---|---|---|
| 1001 | PHONE 1 | 100.50.25.1 | jwilliams | BIT VALUE OF LENGTH N |
| 1002 | PHONE 2 | 100.50.25.2 | bjones | BIT VALUE OF LENGTH N |
| 1003 | PHONE 3 | 100.50.25.3 | ksmith | BIT VALUE OF LENGTH N |
| 1004 | PHONE 4 | 100.50.25.4 | rmorrison | BIT VALUE OF LENGTH N |
| 1005 | PHONE 5 | 100.50.25.5 | jmills | BIT VALUE OF LENGTH N |
| 122 | 124 | 126 | 128 | 130 |

120

SYSTEM AND METHOD FOR SECURING VOICE MAIL MESSAGES

TECHNICAL FIELD OF THE INVENTION

This invention relates generally to the field of messaging, and more specifically to a system and method for securing voice mail messages.

BACKGROUND OF THE INVENTION

Historically, telecommunications have involved the transmission of voice, fax and encoded data signals over a network dedicated to telecommunications, such as the Public Switched Telephone Network (PSTN) or a Private Branch Exchange (PBX). Similarly, data communications between computers also have historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VOIP uses this existing technology to transmit telecommunication signals by converting these signals into digital data for transmission over an IP network.

SUMMARY OF THE INVENTION

In accordance with the present invention, a system and method for securing voice mail messages in a packet network is provided that substantially eliminates or reduces disadvantages or problems associated with previously developed systems and methods. In particular, the present invention encrypts voice mail messages stored in an open file system to prevent unauthorized access to the messages. In one embodiment of the present invention, a system is provided for securing voice mail messages. The system includes a packet network and a telephony device that is coupled to the packet network. The system also includes a voice mail system that is coupled to the packet network and operable to receive a voice mail message from a caller attempting to communicate with a user of the telephony device. The voice mail system is further operable to encrypt the voice mail message using a public key associated with the telephony device and to store the encrypted voice mail message in an open file system coupled to the packet network.

In another embodiment of the present invention, a method is provided for securing voice mail messages. The method includes receiving a telephone call from a caller attempting to communicate with a user of a telephony device that is coupled to a packet network. The method also includes indicating to the caller that the user is not available to communicate with the caller and receiving a voice mail message from the caller for the user. The method further includes encrypting the voice mail message using a public key associated with the telephony device and storing the encrypted voice mail message in a file system such that the encrypted voice mail message is accessible from the packet network.

Technical advantages of the present invention include a system and method for encrypting voice mail messages in a packet network, such as a VOIP network, that prevent unauthorized access to the messages. Particular embodiments of the present invention use a public key encryption process to encrypt an incoming voice mail message using a publicly available key. However, in order to decrypt the message, a private key (known only to the user for which the voice mail message was left) is required. Using such an encryption process, a voice mail system can receive and encrypt messages without the intervention of the user and can store encrypted messages on an open file system. Because the private key is not stored in the file system, even a system administrator with complete access to the file system cannot decrypt the voice mail messages. On the other hand, a user with the private key is able to access the user's messages from any computer or other device that is coupled to the file system, including a computer connected to the file system using the Internet. Therefore, the present invention provides full accessibility to voice mail messages as well as heightened security for those messages. Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which.

DETAILED DESCRIPTION OF THE INVENTION

Figure 1:
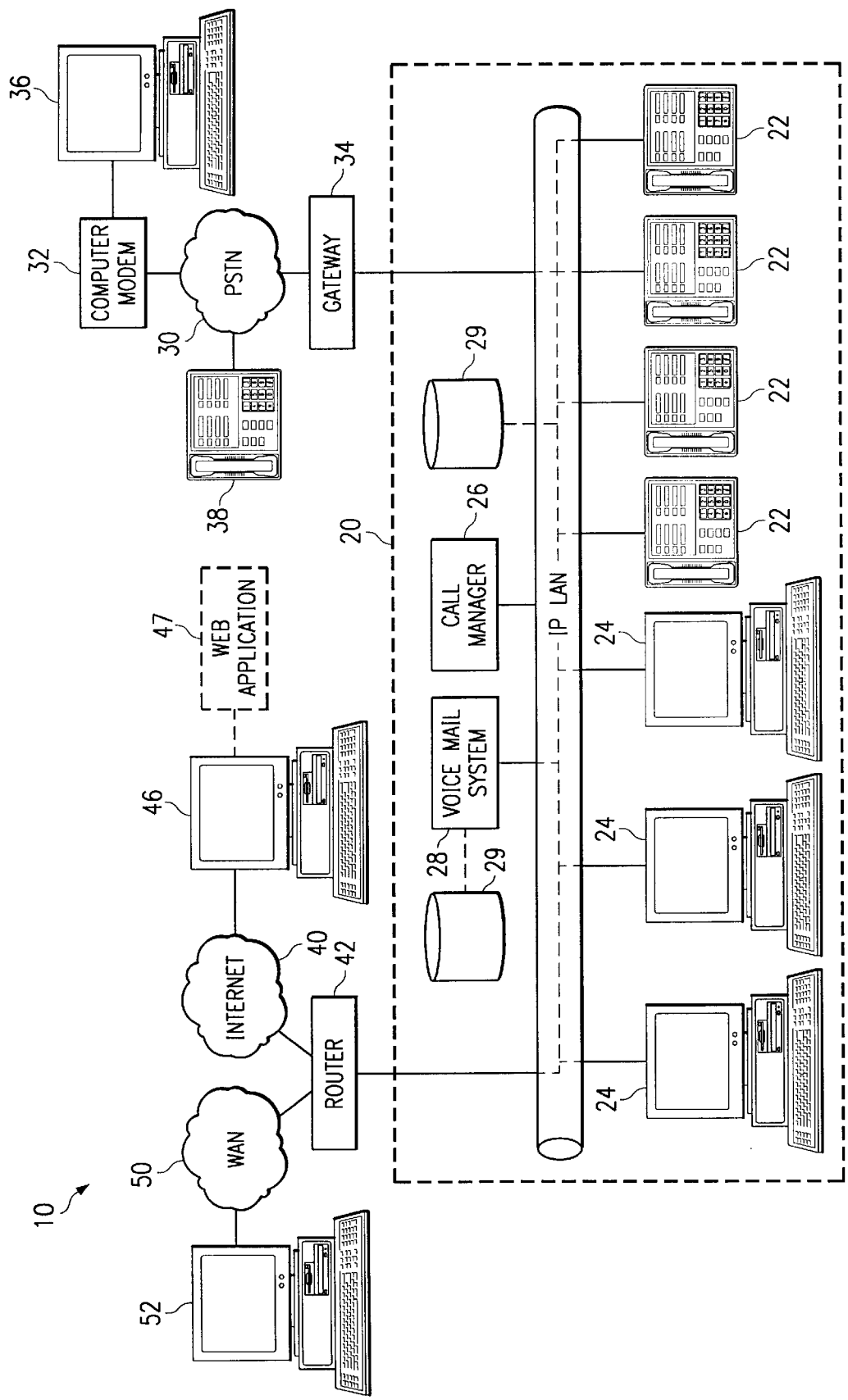
FIG. 1 illustrates an exemplary communication network in accordance with one embodiment of the present invention.

FIG. 1 illustrates an exemplary communications network 10. Communications network 10 includes a local area network (LAN) 20 that communicates audio and/or video telecommunication signals. This functionality eliminates the need for a separate telephone network, such as a private branch exchange (PBX), to provide telecommunication services within a business or other organization. LAN 20 may be coupled to the Public Switched Telephone Network (PSTN) 30, the Internet 40, or a private wide area network (WAN) 50 to allow communication with various devices located outside of LAN 20. Furthermore, LAN 20 includes a voice mail system 28 that operates in conjunction with the telephony devices 22 coupled to LAN 20 to receive and store voice mail messages for users of telephony devices 22, as well as for certain remote devices located outside of LAN 20. As will be described below, the integration of telecommunication services into LAN 20 allows voice mail messages to be encrypted and stored in an open file system supported by LAN 20 for access by an authorized user for a variety of devices in system 10.

LAN 20 may be an Internal Protocol (IP) network or any other type of network that allows the transmission of telecommunication signals as well as traditional data communications. In particular, IP networks transmit data (including telecommunication signals) by placing the data in packets and sending the packets individually to the selected destination. This may be referred to as a packet network. Other types of packet networks include ATM, Frame Relay, Ethernet, SNA, and SONET networks, among others. Unlike a circuit-switched network (e.g., PSTN 30), dedicated bandwidth is not required for the duration of a telecommunication over LAN 20. Instead, each telephony device sends packets as they become available for transmission.

The technology that allows telecommunication signals to be transmitted over an IP network may be referred to as Voice over IP (VoIP). IP telephony devices 22 are coupled to LAN 20 to enable such communication over LAN 20. IP telephony devices 22 have the capability of encapsulating a user's voice (or other inputs) into IP packets so that the voice can be transmitted over LAN 20 (as well as Internet 40 and WAN 50, which may also be packet networks). IP telephony devices 22 may include telephones, fax machines, computers running telephony software, and any other device capable of performing telephony functions over an IP network. A call manager 26 controls IP telephony devices 22. Call manager 26 is an application that controls call processing, routing, telephony device features and options (such as call hold, call transfer and caller ID), device configuration, and other telephony functions and parameters within communications network 10.

When a user wishes to place a call from one telephony device 22 to another telephony device 22 on LAN 20, the calling device transmits signaling to call manager 26 indicating the desired function and destination. Call manager 26 then instructs telephony devices 22 to establish a network connection between themselves over LAN 20. Once telephony devices 22 have established a connection, a codec (coder/decoder) converts the voice or other telecommunication signals generated by the users of telephony devices 22 from analog signals into digital form. Telephony devices 22 may implement the codec either in software or as special-purpose hardware. Once the codec in telephony devices 22 has digitized the telecommunication signals, telephony device 22 then encapsulate the digital data within IP packets so that it can be transmitted over LAN 20. This encapsulation is typically performed by Real-Time Transport Protocol (RTP) running over UDP/IP (User Datagram Protocol/Internet Protocol). The encapsulation process is well-known in the art, and will not be described in further detail. The IP packets are then transported over LAN 20 via the IP protocol to the other telephony device(s) 22 participating in the call. A codec in the other telephony device 22 then translates the IP packet data into analog voice signals for presentation to the user. This process is repeated each time that a call participant (or other source) generates telecommunication signals.

In addition to intra-LAN telephone calls, calls can also be placed to non-IP telephony devices 36, 38 that are connected to PSTN 30. Such calls are made through a VoIP-to-PSTN gateway 34. Gateway 34 converts analog or digital circuit-switched data transmitted by PSTN 30 (or a PBX) to packet data transmitted by LAN 20, and vice-versa. Gateway 34 also translates between the VOIP call control system and the Signaling System 7 (SS7) or other protocols used in PSTN 30. For example, when making a call to a PSTN telephony device 38 from an IP telephony device 22, the telecommunication signal generated by the user of IP telephony device 22 is digitized and encapsulated, as described above. The packets are then transmitted over LAN 20 to gateway 34. Gateway 34 converts the data in the packets to the format (either digital or analog) used by the PSTN trunk to which the gateway is connected. The voice signals are then sent to the PSTN telephony device 38 over PSTN 30. This process is continued between PSTN 30 and LAN 20 through gateway 34 until the call is complete.

Calls also may be made between IP telephony devices 22 and other IP telephony devices located on Internet 40 or across WAN 50. Again, the telecommunication data is digitized and encapsulated into IP packets at the telephony device. However, unlike communications with devices on PSTN 30, a gateway is not needed to convert the IP packets to another format. A router 42 (or other similar device such as a hub or bridge) directs the packets to the IP address of the other IP telephony device.

LAN 20 includes voice mail system 28 that receives messages for users that are unable to receive an incoming telephone call. Although illustrated as a dedicated network device, the software, firmware and/or hardware used to implement voice mail system 28 may be incorporated into one or more devices on LAN 20, including call manager 26. Voice mail system software may be embodied in any type of computer-readable medium. The computer or other device on which the voice mail software is located includes a network interface, a memory or other computer-readable medium to store the software, and a processor to execute the software.

If a calling party is unable to reach a user of a telephony device in system 10, call manager 26 (or any other appropriate device) transfers the call to voice mail system 28. Voice mail system 28 indicates to the caller that the user is not available to communicate with the caller and invites the caller to leave a voice mail message for the user. After receiving a message for the user, voice mail system 28 stores the message in a file system 29 (e.g., as a ".wav" file). File system 29 includes a media storage device, such as a hard drive, diskette, CD-R, C-DRW, DVD-RAM, or any other modifiable storage device. File system 29 may also include any type of volatile or non-volatile computer memory, such as RAM (or its variants), Flash, ROM, PROM, EPROM, EEPROM, or any other appropriate device for storing data. File system 29 may be included in any device on LAN 20 and may be located such that it is accessible independently of voice mail system 28 and/or such that it is accessible from PSTN 30, Internet 40 and/or WAN 50.

One advantage of a VOIP telecommunication system is that voice mail messages can be stored in "open" locations, such as file system 29, that are accessible from devices in LAN 20, as well as devices coupled to PSTN 30, Internet 40, and WAN 50. This is unlike traditional PBX networks in which voice mail messages are typically stored in a repository that is only accessible from a limited number of devices (e.g., only from telephony devices). A user may access a message stored in file system 29 from numerous devices in communication network 10 including, but not limited to, a telephony device 22 or computer 24 coupled to LAN 20, a computer 36 or telephony device 38 coupled to PSTN 30, a computer 46 coupled to Internet 40, or a computer 52 coupled to WAN 50. Therefore, there is much more interconnectivity between the location at which voice mail messages are stored and the potential locations from which a user may wish to access the messages.

Security concerns are raised due to the accessibility of messages stored in file system 29. For example, a system administrator with access to the location at which a user's messages are stored is able to access the user's messages. In addition, if file system 29 is accessible from outside LAN 20, unauthorized users may be able to penetrate file system 29 and obtain a user's messages. System 10 prevents security breaches by encrypting the voice mail messages stored in file system 29.

Figures 2, 3:
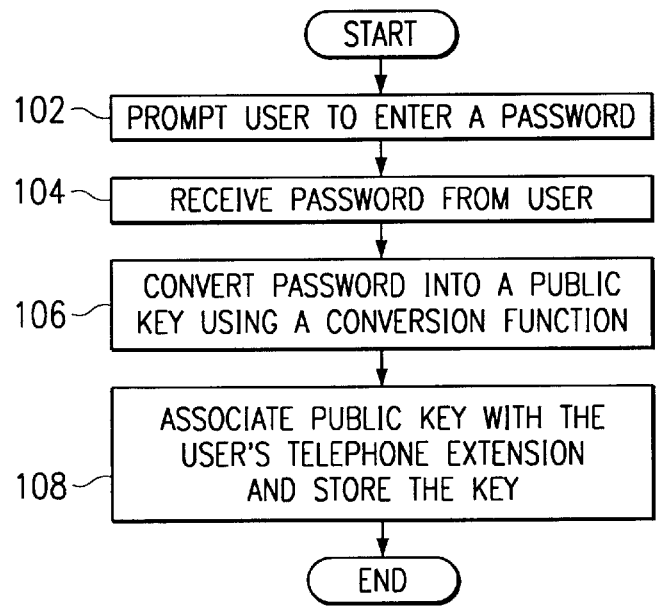
FIG. 2 illustrates a key assignment stage of an encryption process used to secure voice mail messages that are accessible from the communication network.
FIG. 3 illustrates an exemplary public key database for storage of public keys.

FIG. 2 illustrates a key assignment stage of a public key (asymmetric) encryption process used to secure voice mail messages stored in file system 29. In order to provide a user with the ability to access and decrypt voice mail messages, a password is chosen by or assigned to the user. This password may be any combination of letters, numbers or any other types of characters or symbols. According to the method illustrated in FIG. 2, a user is prompted to enter a password at step 102. This prompting may be performed by voice mail system 28 or any other device associated with the encryption or decryption of voice mail messages. Furthermore, this prompting may be performed either when a new user is created or when an existing user requests that the user's password be changed. The user may be identified by a user ID, the user's telephone extension, and/or any other method of associating the user with a particular telephony device.

Voice mail system 28 receives a password entered by the user at step 104. Alternatively, voice mail system 28 may randomly assign a password to the user. The password is converted into a public key using a conversion function at step 106. Alternately, voice mail system 28 may use the user's ID, telephone extension, or other appropriate parameters as input into the conversion function. The conversion function may be a one-way hash function, such as an MD5 algorithm. Using a one-way hash function, a public key is created such that it is very unlikely that the password (or other input) can be derived from the public key even if the one-way hash function used to create the public key is publicly known. Voice mail system 28 associates the public key created from the password with the user's telephone extension or other suitable identification and stores the public key at step 108. Voice mail system 28 does not store the user's password, and thus the password cannot be ascertained by a third party.

The public key is used in conjunction with an asymmetric encryption algorithm to encrypt the user's voice mail messages, and the password is used as a private key to decrypt the messages. However, in an alternative embodiment, the password may be used to create a public key/private key pair (using a conversion function). The key pair is then used to encrypt and decrypt messages, and the password is only used to provide access to a listing of messages or to recreate the private key when a message is to be decrypted, as described below.

FIG. 3 illustrates an exemplary public key database 120 in which voice mail system 28 may store a user's public key. Since the public key is used to encrypt incoming voice mail messages for a particular telephony device, the public key is associated with the telephony device in one or more ways. In database 120, each public key 130 is associated with a telephone extension number 122 of a telephony device 22, a device name 124 of the telephony device 22, an IP address 126 of the telephony device 22, and a user ID 128 of the user associated with the telephony device 22.

It should be understood that not all of these associations may be made, and, alternatively, additional types of associations of a public key with a telephony device may be made. Moreover, such associations may be made in more than one table. For example, a telephone extension 122 may be associated with a device name 124 in a first table, the device name 124 may be associated with a public key 130 in a second table, and a user ID 128 may be associated with the device name 124 in a third table. The association of a user ID with a telephony device allows a user of a telephony device to gain access to the user's messages, as described below, without having to remember a device name or IP address. Alternatively, the user may use the telephone extension number for this purpose.

Figure 4:
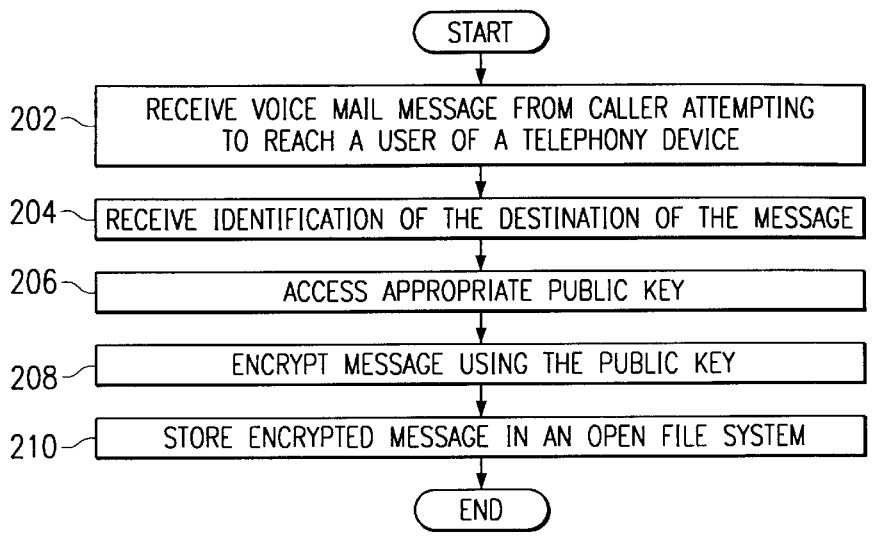
FIG. 4 illustrates a message encryption stage of the encryption process.

FIG. 4 illustrates an encryption stage in the public key encryption process used to secure voice mail messages stored in file system 29. The process begins when voice mail system 28 receives a voice mail message at step 202. Such messages are typically received from callers who have unsuccessfully attempted to reach a user of a particular telephony device (e.g., because the user was away from the telephony device, using the telephony device, or otherwise unavailable). The caller receives an indication that the user is unavailable and leaves a voice message. The device from which the call is being made streams the message to voice mail system 28 using RTP or another appropriate protocol. Along with the message, voice mail system 28 receives the telephone extension of the telephony device being called or some other appropriate identification of the destination for the message (as described above in conjunction with FIG. 3) at step 204. Voice mail system 28 then accesses the appropriate public key from database 120 at step 206.

As voice mail system 28 receives the message, voice mail system 28 encrypts the message at step 208 using the public key of the user to which the message is directed. Each incoming message is encrypted as it is received so that no unencrypted copies of the message are stored anywhere in LAN 20. For the purposes of this application, "stored" does not include transient storage in a computer, such as momentary storage in random access memory (RAM) or one or more buffers that allow the encryption of a media stream. Voice mail system 28 may encrypt the message using any available public key encryption algorithm, such as an RSA (Rivest-Shamir-Adelman) algorithm or a modified chained XOR algorithm. These methods of public key encryption may be referred to as asymmetric encryption since they use one key for encryption (the public key) and another key for decryption (the private key or password). After the encryption process, voice mail system 28 stores the encrypted message in file system 29 at step 210. The files are stored indexed by user ID, telephone extension, or some other identification method to allow messages for a particular user, telephone extension, or other identification method to be accessed.

It should be noted that voice mail system 28 may also encrypt the message using a symmetric encryption algorithm, such as a Data Encryption Standard (DES) algorithm. In such an algorithm, the same key (a "secret key") is used to both encrypt and decrypt the message. Such symmetric encryption is often faster then asymmetric encryption, but may be less secure. However, the advantages of public key encryption may still be realized by using a combination of symmetric and asymmetric encryption. In this case, a voice mail message is encrypted using a secret key as an input into a symmetric encryption algorithm, and then the secret key is encrypted using the public key as an input into an asymmetric encryption algorithm. This method provides the increased speed of symmetric encryption with the increased security of asymmetric encryption.

Figure 5:
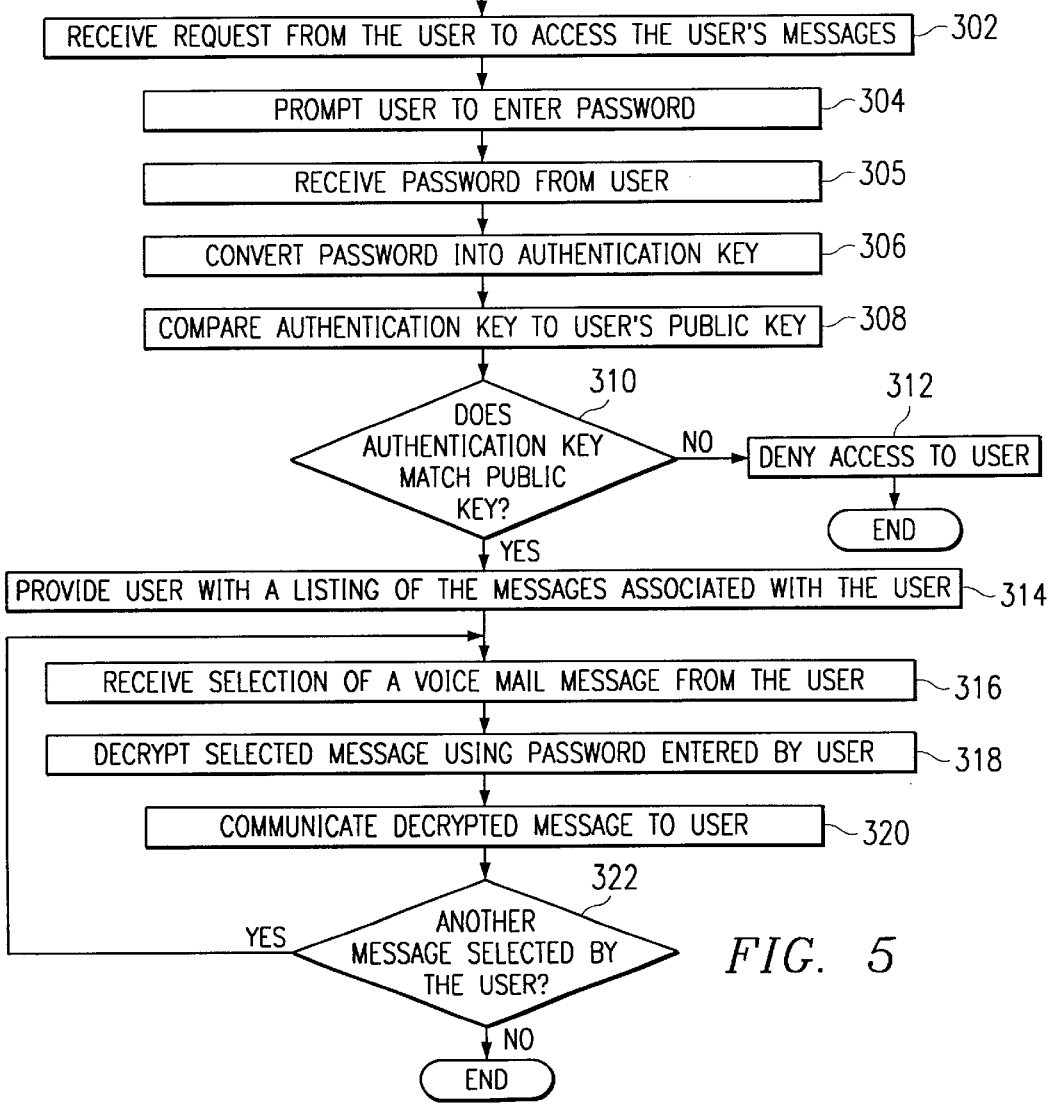
FIG. 5 illustrates a message decryption stage of the encryption process.

FIG. 5 illustrates a decryption stage in the public key encryption process. Voice mail system 28 or file system 29 receives a request from a particular user to access the user's voice mail messages at step 302. Since file system 29 may be located separately from voice mail system 28, file system 29 may have the ability to retrieve and decrypt voice mail messages independently of voice mail system 28. For the purposes of this application, file system 29 should be interpreted to include any application that is operable to access and/or decrypt the stored voice mail messages even if that application is not co-located with the database in which the encrypted messages are stored. For example, a web application 47 executing on computer 46 or an application executing on computer 24 may be used to access the stored voice mail messages, and these applications are to be considered part of file system 29.

In the case where a user is requesting voice mail messages from file system 29, file system 29 prompts the requesting user to enter the user's password at step 304. File system 29 receives an entered password at step 305. In order to determine whether to provide the user with access to the requested messages, file system 29 converts the received password into an authentication key at step 306 using the same conversion function that was used to create the user's public key. Since file system 29 uses the same conversion function, the authentication key should match the user's public key if the entered password is the same as the password that originally was associated with the user, as described in conjunction with FIG. 2. Therefore, file system 29 compares the authentication key with the user's public key at step 308. According to a decisional step 310, if the two keys do not match, the user is denied access to the encrypted voice mail messages at step 312 and the process ends. If the keys match, the user is granted access and file system 29 provides the user with a listing of the messages associated with the user at step 314. For example, if the messages are stored by user ID, the messages for the entered user ID are provided. If the messages are stored by telephone extension or some other method, file system 29 first determines what telephone extension or other method of storage is associated with the entered user ID in public key database 120, or any other appropriate database.

Once the user has access to the listing, the user may select one or more messages to decrypt. File system 29 receives such a selection from the user at step 316. File system 29 decrypts the selected message at step 318 using the password received at step 304 as an input into the public key encryption algorithm that voice mail system 28 (or other device) used to encrypt the message. Thus the password is used as the private key. Alternatively, as described above, voice mail system 28 may have input the user's password into a conversion function to create a public key/private key pair (thus the password is not the private key). In this case, the private key created from the password is not stored in file system 29 or any other location to prevent a system administrator or an unauthorized party from accessing the private key (and thus being able to decrypt messages). Therefore, the password received at step 304 is first used to recreate the private key using the conversion function. The private key, without being stored, is then used to decrypt the message at step 318.

Furthermore, as described above, a message might be encrypted using a symmetric encryption algorithm. In this case, file system 29 uses the password (or a private key created from the password) to decrypt the secret key used to encrypt the message. File system 29 then uses the secret key as an input into the symmetric encryption algorithm to decrypt the message.

Once file system 29 has decrypted the selected message using any of the methods described above, file system 29 communicates the decrypted message to the user at step 320. One method of communicating the decrypted message is to stream the message to the user using RTP or another similar protocol. The message is decrypted and communicated such that a copy of the message is not permanently stored at any location, and thus the confidentiality of the message is maintained. If the message is communicated to a user at a remote device over PSTN 30, Internet 40, WAN 50 or any other external network, the message may be sent in encrypted form. The message may then be decrypted at the user's computer. For access from computer 46 on Internet 40, the message may be streamed to a standard media player plug-in component of a Web browser using Hyper Text Transfer Protocol (HTTP).

In this last embodiment, the password or private key may be stored on the remote device, such as computer 46. Thus, unlike the embodiments described above, the password or private key is accessible to anyone with access to the remote device (and thus the device must be secure). Once a voice mail message is chosen in this embodiment, the encrypted message is streamed to the remote device. The remote device then decrypts the message using the password or private key.

File system 29 determines at step 322 whether another message has been selected by the user for decryption. If a another message is selected, the method returns to step 316. If no additional message is selected, the method ends.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for securing voice mail messages, comprising:

receiving a telephone call from a caller attempting to communicate with a user of a telephony device, the telephony device coupled to a packet network;

indicating to the caller that the user is not available to communicate with the caller;

receiving a voice mail message from the caller for the user of the telephony device;

encrypting the voice mail message using a public key associated with the telephony device; and storing the encrypted voice mail message in a file system such that the encrypted voice mail message is accessible from the packet network;

wherein encrypting the voice mail message using the public key associated with the telephony device comprises encrypting the voice mail message as it is received without storing the unencrypted voice mail message.

2. The method of claim 1, wherein encrypting the voice mail message using the public key associated with the telephony device comprises:

determining the identity of the telephony device being called;

retrieving the public key associated with the telephony device; and encrypting the voice mail message using the public key.

3. The method of claim 1, wherein encrypting the voice mail message using the public key associated with the telephony device comprises encrypting the message using an asymmetric encryption algorithm.

4. The method of claim 1, wherein encrypting the voice mail message using the public key associated with the telephony device comprises:

encrypting the voice mail message using a secret key as an input into a symmetric encryption algorithm; and encrypting the secret key using an asymmetric encryption algorithm.

5. The method of claim 1, wherein storing the encrypted voice mail message in a file system comprises storing the encrypted voice mail message in a file system accessible from the Internet.

6. The method of claim 1, wherein storing the encrypted voice mail message in a file system comprises storing the encrypted voice mail message in a file system accessible independently of the voice mail system.

7. The method of claim 1, further comprising:
associating a password with the user of the telephony device;
associating the user with the telephony device; and
converting the password into the public key associated with the telephony device using a conversion function.

8. The method of claim 7, further comprising:
receiving a request from the user to access encrypted voice mail messages stored in the file system and associated with the telephony device;
prompting the user to enter a password;
converting the password received from the user into an authentication key using the conversion function;
comparing the authentication key to the public key associated with the telephony device; and
providing the user with access to a listing of encrypted voice mail messages associated with the telephony device if the authentication key matches the public key.

9. The method of claim 8, further comprising:
receiving a selection from the user of an encrypted voice mail message in the listing;
decrypting the selected voice mail message using the password received from the user; and
communicating the decrypted message to the user.

10. The method of claim 9, wherein decrypting the selected voice mail message using the password received from the user comprises using the password as a private key input into an asymmetric encryption algorithm used to encrypt the voice mail message.

11. The method of claim 9, wherein decrypting the selected voice mail message using the password received from the user comprises:
decrypting a secret key using the password as a private key input into an asymmetric encryption algorithm used to encrypt the secret key; and
decrypting the selected voice mail message by inputting the secret key into a symmetric encryption algorithm used to encrypt the voice mail message.

12. The method of claim 9, wherein communicating the decrypted message to the user comprises streaming the decrypted message to the user as it is decrypted without storing the decrypted message.

13. The method of claim 8, further comprising:
receiving a selection from the user of an encrypted voice mail message in the listing;
communicating the encrypted message to the user;
decrypting the selected voice mail message using the password received from the user.

14. A system for securing voice mail messages in a packet network, comprising:
a packet network;
a telephony device coupled to the packet network; and
a voice mail system coupled to the packet network and operable to receive a voice mail message from a caller attempting to communicate with a user of a telephony device coupled to the packet network, the voice mail system further operable to encrypt the voice mail message using a public key associated with the telephony device and to store the encrypted voice mail message in an open file system coupled to the packet network;
wherein encrypting the voice mail message using the public key associated with the telephony device comprises encrypting the voice mail message as it is received without storing the unencrypted voice mail message.

15. The system of claim 14, wherein the voice mail system is further operable to:
associate a password with the user of the telephony device;
associate the user with the telephony device; and
convert the password into the public key associated with the telephony device using a conversion function.

16. The system of claim 14, wherein the voice mail system is further operable to:
receive a request from the user to access encrypted voice mail messages associated with the telephony device;
prompt the user to enter a password;
convert the password received from the user into an authentication key using the conversion function;
compare the authentication key to the public key associated with the telephony device; and
provide the user with access to a listing of encrypted voice mail messages associated with the telephony device if the authentication key matches the public key.

17. The system of claim 16, wherein the voice mail system is further operable to:
receive a selection from the user of an encrypted voice mail message in the listing;
decrypt the selected voice mail message using the password received from the user; and
stream the decrypted message to the user as the message is decrypted without storing the decrypted message.

18. The system of claim 14, wherein the encrypted voice mail message is accessible from the Internet.

19. The system of claim 14, wherein the voice mail system stores the encrypted voice mail message in a separate, independent file system.

20. Voice mail security software embodied in a computer-readable medium and operable to perform the following steps:
receiving a telephone call from a caller attempting to communicate with a user of a telephony device, the telephony device coupled to a packet network;
indicating to the caller that the user is not available to communicate with the caller;
receiving a voice mail message from the caller for the user of the telephony device;
encrypting the voice mail message using a public key associated with the telephony device; and
storing the encrypted voice mail message in a file system such that the encrypted voice mail message is accessible from the packet network;
wherein encrypting the voice mail message using the public key associated with the telephony device comprises encrypting the voice mail message as it is received without storing the unencrypted voice mail message.

21. The voice mail security software of claim 20, wherein encrypting the voice mail message using the public key associated with the telephony device comprises:
determining the identity of the telephony device being called;

retrieving the public key associated with the telephony device; and encrypting the voice mail message using the public key.

22. The voice mail security software of claim 20, wherein encrypting the voice mail message using the public key associated with the telephony device comprises encrypting the message using an asymmetric encryption algorithm.

23. The voice mail security software of claim 20, wherein encrypting the voice mail message using the public key associated with the telephony device comprises:

encrypting the voice mail message using a secret key as an input into a symmetric encryption algorithm; and encrypting the secret key using an asymmetric encryption algorithm.

24. The voice mail security software of claim 20, wherein storing the encrypted voice mail message in a file system comprises storing the encrypted voice mail message in a file system accessible from the Internet.

25. The voice mail security software of claim 20, wherein storing the encrypted voice mail message in a file system comprises storing the encrypted voice mail message in a file system accessible independently of the voice mail system.

26. The voice mail security software of claim 20, further operable to perform the following steps:

associating a password with the user of the telephony device;

associating the user with the telephony device; and converting the password into the public key associated with the telephony device using a conversion function.

27. The voice mail security software of claim 26, further operable to perform the following steps:

receiving a request from the user to access encrypted voice mail messages stored in the file system and associated with the telephony device;

prompting the user to enter a password;

converting the password received from the user into an authentication key using the conversion function;

comparing the authentication key to the public key associated with the telephony device; and providing the user with access to a listing of encrypted voice mail messages associated with the telephony device if the authentication key matches the public key.

28. The voice mail security software of claim 27, further operable to perform the following steps:

receiving a selection from the user of an encrypted voice mail message in the listing;

decrypting the selected voice mail message using the password received from the user; and communicating the decrypted message to the user.

29. The voice mail security software of claim 28, wherein decrypting the selected voice mail message using the password received from the user comprises using the password as a private key input into an asymmetric encryption algorithm used to encrypt the voice mail message.

30. The voice mail security software of claim 28, wherein decrypting the selected voice mail message using the password received from the user comprises:

decrypting a secret key using the password as a private key input into an asymmetric encryption algorithm used to encrypt the secret key; and decrypting the selected voice mail message by inputting the secret key into a symmetric encryption algorithm used to encrypt the voice mail message.

31. The voice mail security software of claim 28, wherein communicating the decrypted message to the user comprises streaming the decrypted message to the user as it is decrypted without storing the decrypted message.

32. The voice mail security software of claim 27, further operable to perform the following steps:

receiving a selection from the user of an encrypted voice mail message in the listing;

communicating the encrypted message to the user;

decrypting the selected voice mail message using the password received from the user.

* * * * *